United States Patent
Bertels

(10) Patent No.: US 8,696,285 B2
(45) Date of Patent: Apr. 15, 2014

(54) CONICAL SCREW COUPLING

(75) Inventor: Augustinus Wilhelmus Maria Bertels, Doorwerth (NL)

(73) Assignee: Bronswerk Radiax Technology B.V., Nijkerk (NL)

(*) Notice: Subject to any disclaimer, the term of this patent is extended or adjusted under 35 U.S.C. 154(b) by 499 days.

(21) Appl. No.: 12/935,988

(22) PCT Filed: Apr. 2, 2009

(86) PCT No.: PCT/NL2009/000078
§ 371 (c)(1),
(2), (4) Date: Dec. 27, 2010

(87) PCT Pub. No.: WO2009/123441
PCT Pub. Date: Oct. 8, 2009

(65) Prior Publication Data
US 2011/0084482 A1   Apr. 14, 2011

(30) Foreign Application Priority Data
Apr. 2, 2008   (NL) .................................. 2001433

(51) Int. Cl.
*F16B 33/00* (2006.01)
*F16B 33/02* (2006.01)
(52) U.S. Cl.
USPC .......................... 411/426; 411/366.1; 411/411
(58) Field of Classification Search
USPC .......................... 285/333; 411/366.1, 411, 426
See application file for complete search history.

(56) References Cited

U.S. PATENT DOCUMENTS

| | | | | |
|---|---|---|---|---|
| 2,508,409 A | * | 5/1950 | Lord | 411/268 |
| 2,861,851 A | * | 11/1958 | Young | 92/244 |
| 2,940,787 A | | 6/1960 | Goodner | |
| 4,004,832 A | | 1/1977 | Connelly | |
| 4,496,174 A | | 1/1985 | McDonald et al. | |
| 4,861,209 A | * | 8/1989 | Larsson | 411/411 |
| 5,138,313 A | * | 8/1992 | Barrington | 340/854.6 |
| 6,196,598 B1 | * | 3/2001 | Yao | 285/333 |
| 6,371,709 B1 | | 4/2002 | Papafotiou et al. | |
| 6,764,108 B2 | * | 7/2004 | Ernst et al. | 285/333 |
| 6,810,956 B1 | * | 11/2004 | Sandstrom | 166/242.6 |

(Continued)

FOREIGN PATENT DOCUMENTS

| | | |
|---|---|---|
| GB | 750073 | 6/1956 |
| WO | 0019056 A1 | 4/2000 |
| WO | 2007092869 A2 | 8/2007 |

*Primary Examiner* — Victor Batson
*Assistant Examiner* — Tyler Johnson
(74) *Attorney, Agent, or Firm* — The Webb Law Firm

(57) ABSTRACT

A screw coupling between two bodies, one having an external screw thread and another having an internal screw thread complementary thereto, which screw threads are superimposed onto two base surfaces monotonously narrowing and widening respectively in the direction of a central axis, the longitudinal section of each of these screw threads relative to the central axis being a periodic univalent function which is continuous at least at the inflection points. The screw coupling has the following features: the first and second derivatives of the longitudinal section of each screw thread along the base surface is a continuous function; the second derivative of the longitudinal section of each screw thread relative to the central axis is a continuous function at least in the region of the inflection points; and the screw threads are in mutual contact over a substantial surface area differing from line contact.

26 Claims, 18 Drawing Sheets

(56) References Cited

U.S. PATENT DOCUMENTS

| | | |
|---|---|---|
| 6,918,723 B2 * | 7/2005 | Battig et al. ............... 411/17 |
| 7,255,183 B2 * | 8/2007 | Cramer ............... 175/320 |
| 7,900,968 B2 * | 3/2011 | Camwell et al. ............... 285/47 |
| 8,308,199 B2 * | 11/2012 | Camwell et al. ............... 285/47 |
| 2007/0009340 A1 | 1/2007 | Van Cor |

\* cited by examiner

CONICAL SCREW COUPLING

BACKGROUND OF THE INVENTION

1. Field of the Invention

The invention relates to a screw coupling between two bodies, the one of which has an external screw thread and another has an internal screw thread complementary thereto, which screw threads are superimposed onto two for instance truncated conical base surfaces monotonously narrowing and widening respectively in the direction of a central axis, the longitudinal section of each of these screw threads relative to the central axis being a periodic univalent function which is continuous at least at the inflection points.

2. Description of Related Art

Such a screw coupling has been known and commercially available for many years.

This known coupling comprises screw threads with a longitudinal section relative to the central axis which consists of mutually alternating circular arcs which are in most cases identical.

The drawback of such a known screw coupling is that the leads of the screw threads are in line contact with each other, whereby the contact pressure is great in the active mode of the coupling and may result in plastic deformation of the contact surfaces.

SUMMARY OF THE INVENTION

It is an object of the invention to embody a screw coupling of the described type such that the contact zones do not make line contact but surface contact with each other, whereby the contact pressure is substantially reduced and plastic deformation thereof must be considered almost precluded.

It is a further object of the invention to embody a screw coupling of the described type such that there is no danger of leakage in the case of a sealing function for medium under pressure.

According to the invention the above stated objects are primarily realized with the screw coupling of the stated type, which has the feature that the first derivative of the longitudinal section of each screw thread along the base surface is a continuous function;

the second derivative of the longitudinal section of each screw thread along the base surface is a continuous function;

the second derivative of the longitudinal section of each screw thread relative to the central axis is a continuous function at least in the region of the inflection points; and the screw threads are in mutual contact over a substantial surface area differing from line contact.

In a determined embodiment the screw connection can have the special feature that both screw threads are substantially identical.

According to the invention the screw connection can further have the special feature that the function is symmetrical along the base surface.

An embodiment which satisfies said stated options simultaneously has the special feature that the function is a sine function.

Another embodiment has the special feature that the function is calculated on the basis of a Fourier series.

For practical reasons and in order to prevent sharp edges and transitions which could result in excessive material stresses and breakage, the screw coupling according to the invention can have the special feature that the harmonics above a chosen maximum ranking number, for instance 5, are ignored. The omission of the harmonics takes place during the design process in the direction from the higher to the lower-order terms, until the technically achievable accuracy is achieved.

A practical embodiment has the feature that the screw coupling is dimensioned such that, after insertion of the external screw thread into the internal screw thread, the bodies must be rotated through an angle of rotation of less than 360° relative to each other in order to block a further rotation.

According to another aspect of the invention, the screw connection has the feature that the angle of rotation lies in the range of about 70°-240°.

This latter embodiment can further have the feature that the angle of rotation lies in the range of about 120°-180°.

On the basis of materials science considerations the screw connection can have the feature that the half-apex angle of the cone tangent of the base surfaces is considerably smaller at each axial position than the natural shear angle of the applied materials under torsional stress.

This latter embodiment can have the particular feature that said shear angle amounts to 45° and the half-apex angle has a value of a maximum of about 30°.

This latter variant preferably has the special feature that the value of the apex angle amounts to about 15°±50%.

As stated above, it is one of the objects of the invention to design a screw coupling such that it naturally forms an excellent seal for medium under pressure. It may nevertheless be advantageous to improve the medium sealing still further. For this purpose the screw coupling according to the invention can have the special feature that sealing means are added to the screw coupling, for instance a cover layer of flexible material such as a rubber or a PTFE, or a viscous or pasty material, for instance Molykote®

For instance in the case where the bodies are rods which are mutually coupled by means of a screw coupling according to the invention, it can be important, at least at the position of the screw coupling, to increase the bending stiffness of the screw coupling. In this respect the screw coupling according to the invention can have the feature that each of the two bodies has a contact surface, which two contact surfaces press against each other in the active mode of the screw coupling and thus increase the bending stiffness of the screw coupling.

According to yet another aspect of the invention, the screw coupling comprises locking means for locking the screw coupling against undesired relative return rotation of the bodies.

This screw coupling can have the particular feature that the locking means comprise a ring with non-round inner surface which is slidable and securable over the screw coupling, which inner surface co-acts with corresponding, complementarily formed outer surfaces around the respective screw threads, which outer surfaces lie at least substantially in one imaginary plane in the active mode of the screw coupling.

Practical and easy, to produce is an embodiment in which said inner surface and said outer surfaces are flat.

The above stated two embodiments relate to a "hard" locking, which offers no rotational freedom but which, from a certain angle of tolerance, totally blocks a return displacement of the screw connection in a manner comparable to a hard stop.

The rotation locking can also take place in "soft" manner. In such an embodiment the screw coupling according to the invention can for instance have the special feature that the locking means comprise friction means.

According to this latter aspect of the invention, the screw coupling can have the special feature that the friction means comprise a friction element present on the one body, for instance a ring of friction material, for instance a rubber-like material, in the region of the screw coupling, which friction element is added to one of the two bodies; which friction element exerts some pressure on an opposite contact surface of the other body in the active mode of the screw coupling.

The screw connection according to the invention can be successfully applied for instance for use in surgical procedures on the bone structure. A screw connection intended for this purpose can thus have the special feature that the one body is a screw comprising a counter-sinkable head of at least more or less truncated conical main shape which corresponds to the base surface, and a threaded end with a screw thread which is superimposed onto a cylindrical base surface, wherein said main plane has the same central axis as said base surface and the pitch of the one screw thread is the same as that of the other screw thread.

This screw connection can particularly have the special feature that the screw thread superimposed onto the cylindrical base surface is of discrete type. "Discrete type" is understood to mean a screw thread which does not have roughly the same longitudinal sectional form at every position but wherein the screw thread is of discontinuous type and consists of a helical series of rounded protrusions similar to small segments of a sphere. Such a structure is advantageous in bone surgery because such a discrete screw thread loads the bone, which can be provided beforehand with a borehole, locally with a relatively high pressure. This enhances the bone growth and thus aids recovery of the patient.

The geometry of the protrusions, i.e. their form and dimensions, is preferably chosen such that, after insertion of the screw into a pre-drilled hole, the elastic limit of the bone is not exceeded, or at least not substantially.

The protrusions can be manufactured with any suitable method. A new, possibly suitable method consist of the so-called laser cusing.

A screw coupling according to the invention can in practice be effected with little difficulty due to the co-action between the for instance more or less truncated conical recess and protrusion. It can nevertheless be advantageous in some circumstances if a central locating pin is added to the external screw thread and a central cavity is added to the internal screw thread, into which the locating pin fits and into which the locating pin can already be inserted before the screw threads come into mutual contact.

According to yet another aspect of the invention, the screw coupling according to the invention has the feature that at least one of the screw threads has at least one zone extending along the base surface which is free of at least the most protruding part of the screw thread and thus forms a passage for a medium, for instance cooling medium.

A truncated conical base surface with substantially any desired apex angle can be provided with a screw thread by a suitable machining process, for instance by milling, grinding, spark machining, electrochemical machining or other suitable processes. The screw connection can particularly have the special feature that a screw thread is formed by making use of a rotatingly driven bit, a spherical milling head, spark machining tool or the like, modelled in accordance with the desired shape of the screw thread, which is driven in both axial direction and radial direction and runs successively through a rotating path relative to the relevant body.

The invention finds application in various technical fields. Two shafts can for instance be coupled to each other collinearly and coaxially such that they are connected to each other completely free of play. The one shaft can for instance be a motor shaft which is coupled via a coupling according to the invention to the shaft of a rotor with a chosen function, for instance the rotor of a centrifugal pump. According to the invention such a screw connection between two shafts can be effected exceptionally easily, for instance by bringing the two shafts into mutual contact at the position of the screw threads and performing a relative rotation through for instance 180°, wherein the relative direction of rotation of the motor shaft corresponds to the direction in which the motor drives this motor shaft during use. Without further provisions it is necessary to prevent the motor rotating in the opposite direction, since the screw connection would otherwise come loose. Use can be made of a hard rotation locking of the above stated type. In this case the driving can take place in both directions.

Also important is the possibility of optionally incorporating a controlled passage, for instance for a cooling medium, which can discharge heat from the motor or the rotor. A row of wave crests lying in a line can for instance thus be flattened to some extent, or a channel can extend more or less along the cone surface.

The applications of the screw connection according to the invention are numerous. The screw connection according to the invention can for instance find application in the context of hose couplings and pipe couplings.

The screw coupling can thus have the special feature that the screw coupling is a coupling between two pipes through which medium can flow, the mutually connecting inner surfaces of which pipes connect to each other without any appreciable narrowing, obstruction or interruption, such that medium flowing through the pipes can pass over the screw coupling with negligible disruption.

In a surprising and highly effective embodiment the screw coupling according to the invention has the special feature that the base surfaces are flat, therefore take the form of truncated cones with apex angles of 2×90°.

This latter embodiment can have the special feature that the screw coupling is dimensioned such that, after insertion of the one screw thread into the other screw thread, the bodies must be rotated relative to each other through an angle of rotation of less than 90°, preferably less than 45°, still more preferably less than 22°, in order to block a further rotation.

DETAILED DESCRIPTION OF THE PREFERRED EMBODIMENTS

Figure 1:
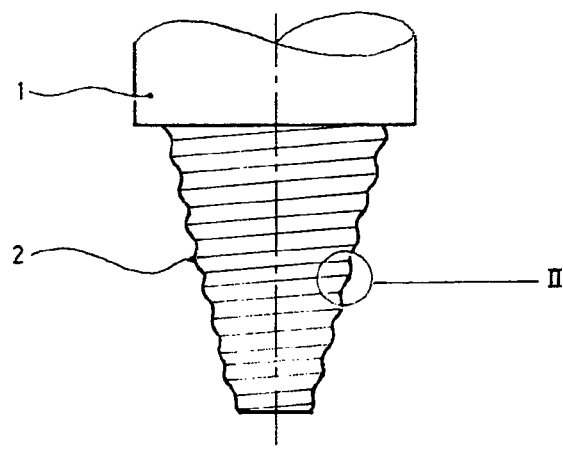
FIG. 1 shows a side view of a prior art conical screw.

FIG. 1 shows a part of a rod 1 which is provided at its end with a known conical screw thread 2.

Figure 2:
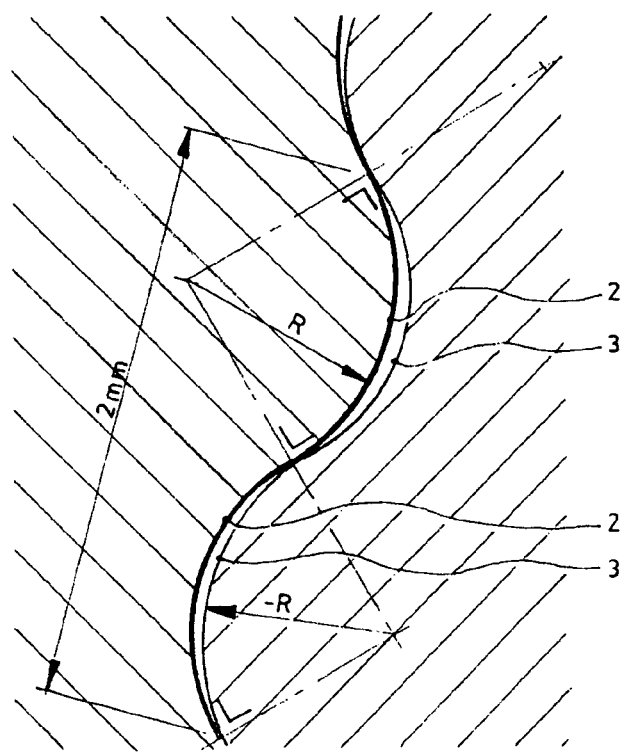
FIG. 2 shows detail II in which a complementary screw thread is also shown for the purpose of elucidating the above stated drawbacks of the prior art.

FIG. 2 shows the detail II on enlarged scale. This shows that conical thread 2, which in this embodiment has a pitch along the conical jacket surface of 2 mm, only makes contact with screw thread 3 of a complementary threaded hole at two points in the cross-section along the pitch length, compare for instance FIG. 5.

Figure 3:
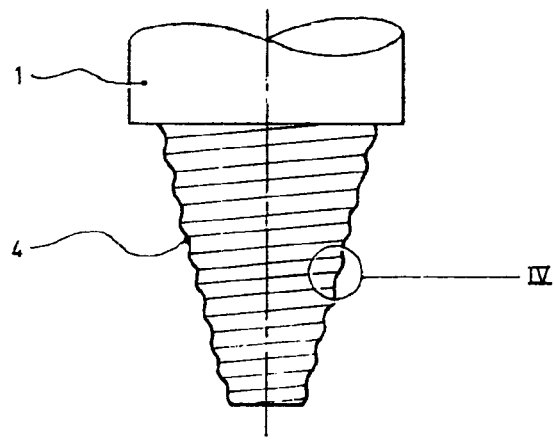
FIG. 3 shows a view corresponding to FIG. 1 of a conical screw according to the invention.
Figure 4:
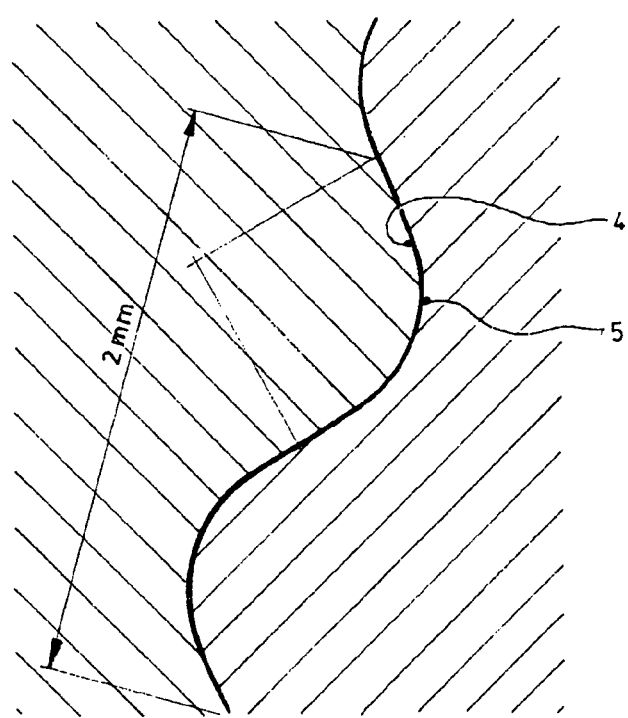
FIG. 4 shows a view corresponding to FIG. 2 of two co-acting screw threads according to the invention, which shows that the mutually facing surfaces lie against each other over their whole surface area.

FIGS. 3 and 4 show views corresponding to FIGS. 1 and 2 of a conical screw according to the teaching of the present invention. As shown in FIG. 4, conical thread 4 does not consist of circle segments as designated symbolically with R in FIG. 2, but of a sine function, therefore a continuous function, the first and second derivatives of which are also continuous. It must be understood that, in the case of the circle segments according to FIG. 2, the second derivative, roughly corresponding to the curve, undergoes an abrupt, discontinuous transition between a positive value R and a negative value −R. In a sine function there is no such abrupt transition. As a result it can be determined on a mathematical basis that the external screw thread 4 and internal screw thread 5 do not have line contact in common with each other, but surface contact.

Figure 5:
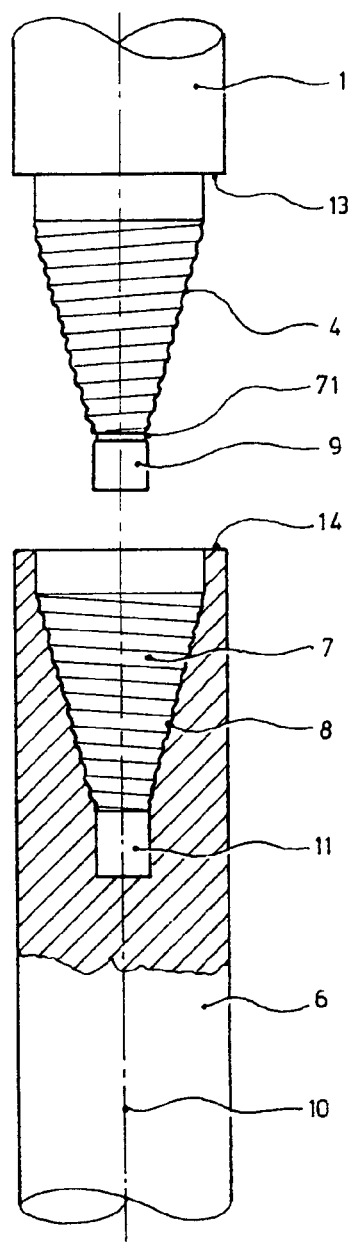
FIG. 5 shows a cross-section through a coupling between two shaft with a screw connection according to the invention.

FIG. 5 shows rod 1 with the conical thread 4 according to the invention, as well as a second rod 6 which is provided with a threaded hole 7 with a conical screw thread 8. Conical thread 4 and conical thread 8 are the same and together form a screw coupling according to the invention. Situated in the drawn embodiment at the end of conical thread 4 is a locating pin 9 which can be received with some clearance in a recess 11 which, just as first rod 1, conical thread 4, locating pin 9, second rod 6, conical thread 8 and locating pin 9, is placed coaxially relative to central axis 10.

Situated in the transition zone between conical thread 4 and locating pin 9 is an annular recess 71 which defines the end of screw thread 4.

Figure 6:
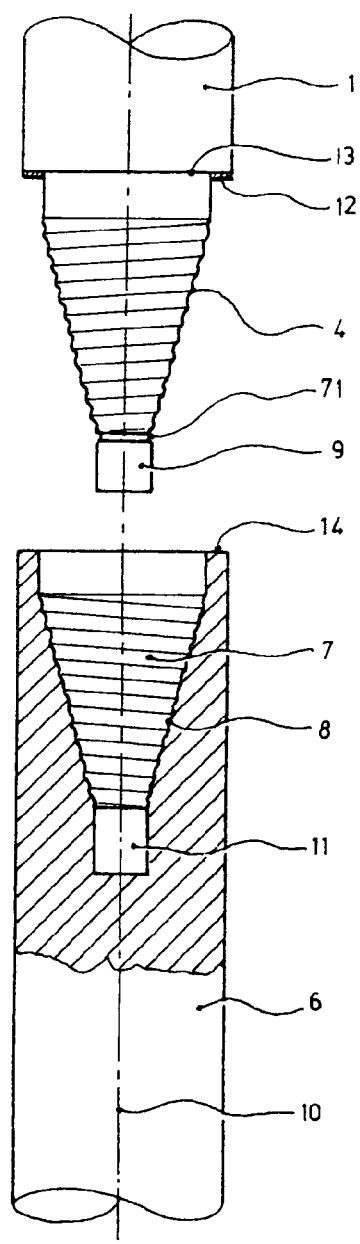
FIG. 6 shows the coupling of FIG. 5 with a friction ring serving as rotation locking.

FIG. 6 shows a screw coupling according to the invention substantially corresponding to FIG. 5. In this embodiment however, a friction ring 12, for instance of a rubber-like material, connects to the annular widened lower surface 13 of first rod 1, which in the structure according to FIG. 5 can be placed into direct pressing co-action with the corresponding upper surface 14 of second rod 6. When the screw coupling according to FIG. 6 is effected, friction ring 12 is clamped with some force between said annular surfaces 13 and 14 at the end of the fastening turn. As a result of the thereby created tight friction coupling, a return relative rotation of first rod 1 and second rod 6 is at least more or less blocked and unintended and uncontrolled release of the screw coupling is at least substantially prevented.

Figure 7:
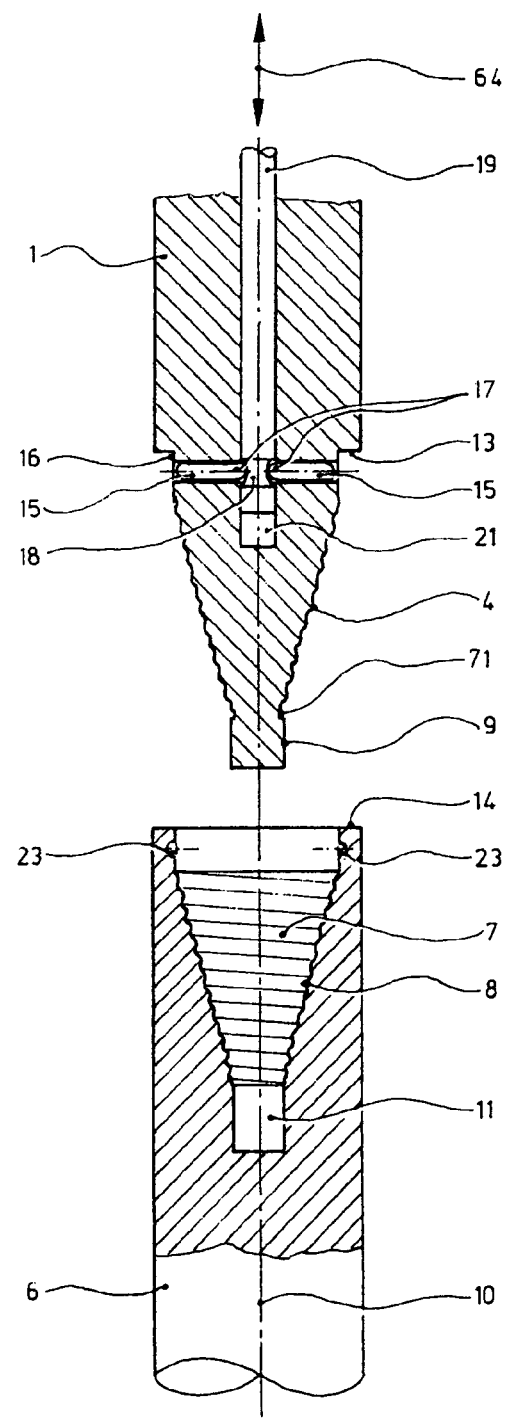
FIG. 7 shows a cross-section through an alternative shaft coupling with internal mechanical locking, in non-coupled situation.

FIG. 7 shows an embodiment in which mechanically controllable rotation locking means are arranged.

Situated for this purpose on the upper side of conical screw thread 4 is an expandable construction comprising a number of radially displaceable elements 15 which, in the non-active mode of the screw coupling drawn in FIG. 7, are retracted and lie inside the peripheral surface 16 of the part above conical thread 4. In this situation the rounded inner zones 17 lie inside an annular recess 18 of a control rod 19 movable in axial direction 64. In the situation shown in FIG. 7 the external conical screw thread 4 can be brought into contact with the internal conical screw thread 8.

After fully realizing the coupling by performing the rotation serving for this purpose, for instance through a half-turn or about 180°, the rotation locking with the radially displaceable elements 15, for instance pins or segments, can take place by moving control rod 19 downward as according to an arrow 20 to the bottom of the cylindrical coaxial cavity 21 intended for this purpose in first rod 1 in the region of conical screw thread 4.

Figure 8A:
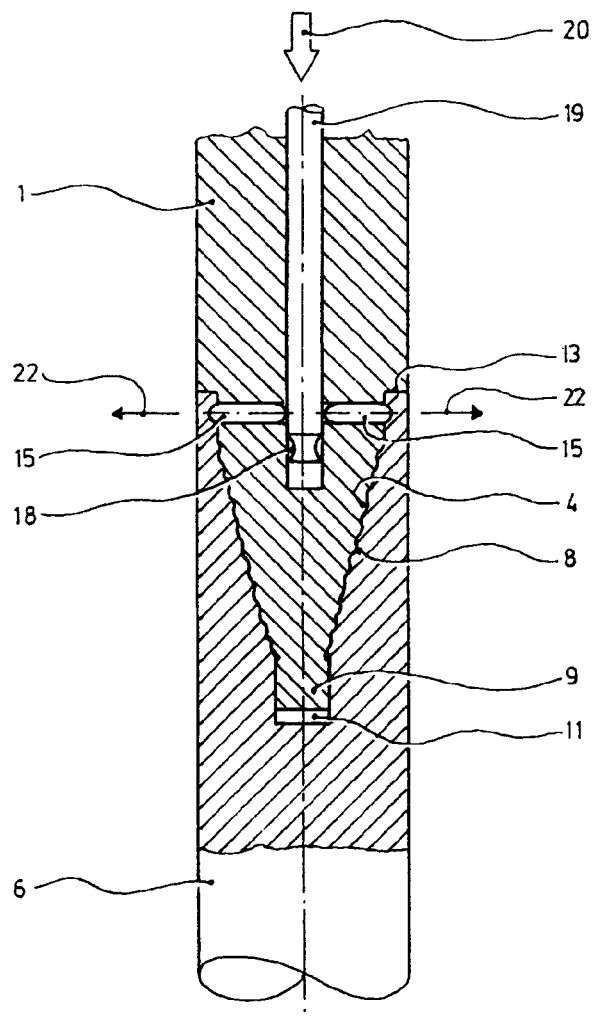
FIG. 8A shows a longitudinal section through the screw connection in FIG. 7 in active mode.

As shown in FIG. 8A, annular recess 18 hereby passes over the rounded inner zones of the displaceable rotation locking elements 15, which are thereby urged to move outward as according to arrows 22 and in this situation can engage in correspondingly formed cavities 23, for instance one annular cavity, such that in the expanded situation according to FIG. 8 the locking elements 15 engage in cavities 23. These cavities can take an individual form such that, even in the case there is no clamping force, elements 15 provide for a rotation locking. It can also be the clamping force caused by enclosing of the elements 15 between control rod 19 and the bottom of cavities 23 which brings about the rotation locking.

Figure 8B:
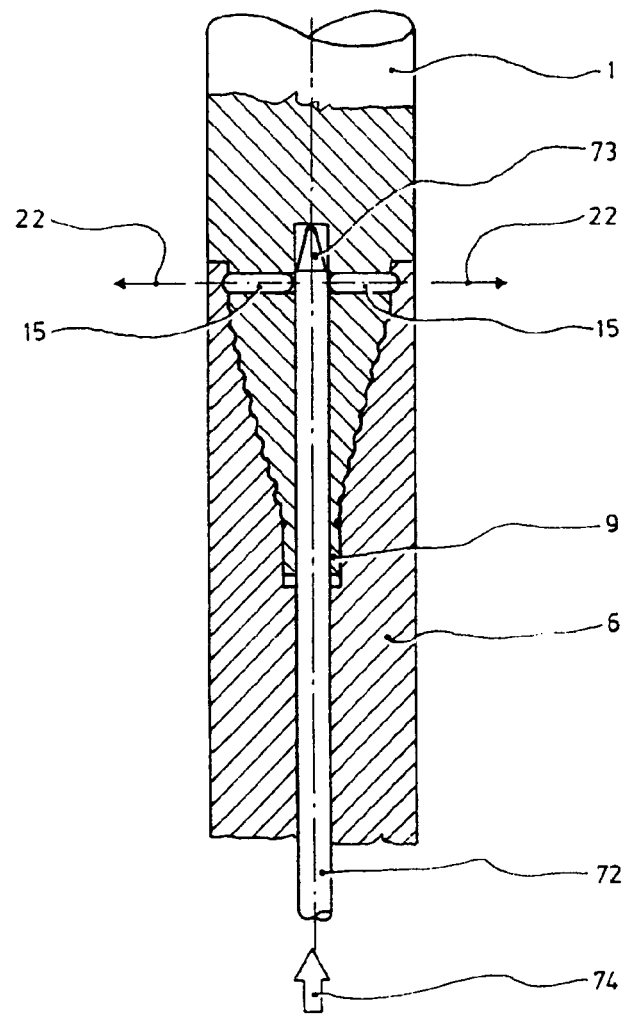
FIG. 8B shows a longitudinal section corresponding to FIG. 8A of a variant in which the rotation locking takes place from the other side.

FIG. 8B shows a variant in which a control rod 72 does not extend through first rod 1 as in the embodiment according to FIG. 8A, but through second rod 6.

It is here noted that, although rods 1 and 6 in FIGS. 8A and 8B are not identical, they are nevertheless designated with the same reference numerals because their ultimate functionalities are the same.

Control rod 72 has a roughly conical leading zone 73 with rounded tip, functionally analogous to annular recess 18 of control rod 19. As control rod 72 is displaced upward according to arrow 74, the displaceable elements 15 move outward according to arrows 22 and thus take up their locking position. It is noted that displaceable elements 15 need only provide a locking against axial displacement. This is because, as a result of the screw structure, a rotation locking is hereby also realized, which may for instance be necessary in the case of driving in two directions.

Figure 8C:
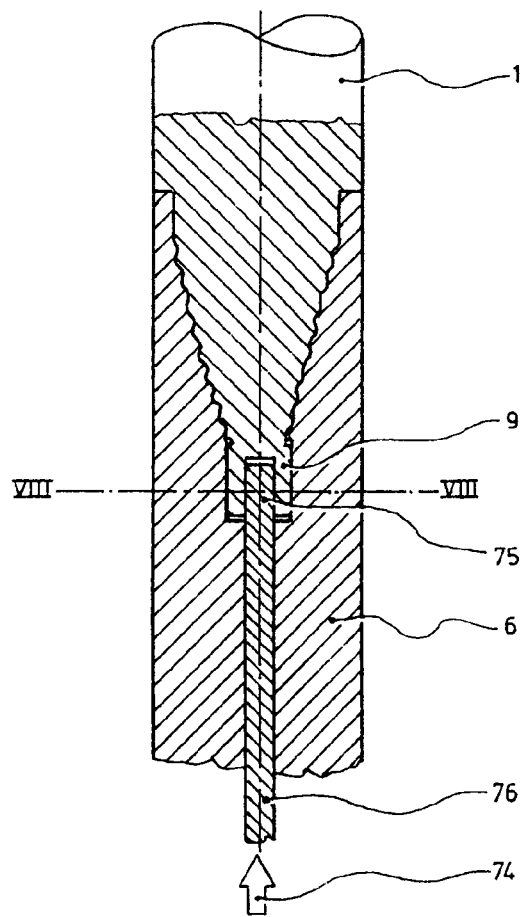
FIG. 8C shows a longitudinal section corresponding to FIGS. 8A and 8B through a variant in which rotation locking takes place from the underside using a round rod.

FIG. 8C shows a rotation locking of a different type. In this embodiment locating pin 9 has a central non-round hole 75 into which a rod 76 of complementary form and with at least a non-round end can be inserted. The rod extends through second rod 6. Locking rod 76 is coupled to second rod 6 for rotation locking by means of means which are not shown. This ensures the rotation locking between the first rod and second rod 6. The direction of displacement between the non-operative position and the operative position of locking rod 76 is indicated with arrow 74.

Figure 8D:
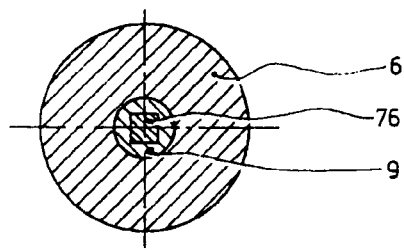
FIG. 8D shows the cross-section VIII-VIII of FIG. 8C.

FIG. 8D shows that locking rod 76 has a square cross-sectional shape.

Figure 9:
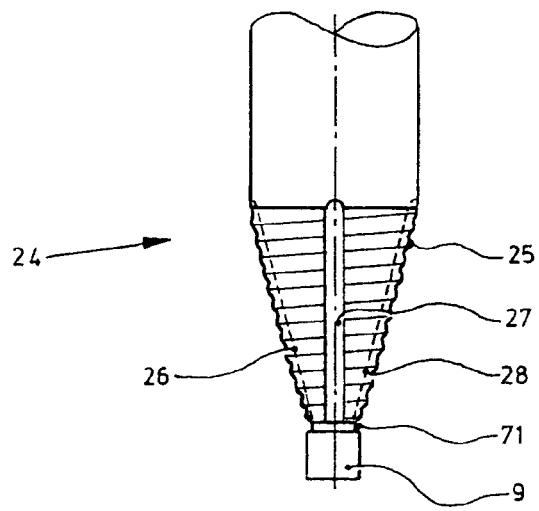
FIG. 9 shows a side view of a conical screw with grooves serving as medium passages.

FIG. 9 shows a screw 24 with a conical screw thread 25 according to the invention, which thread 25 has four grooves 26, 27, 28, 29 for passage of medium, for instance cooling medium.

Figure 10:
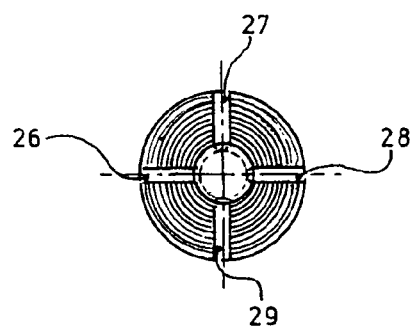
FIG. 10 shows an end view of the screw according to FIG. 9.

As shown clearly in FIG. 10, the four grooves are arranged in angularly equidistant manner at angles of 90°, and grooves 26-29 extend in straight lines along the general jacket surface or base surface of conical screw thread 25.

During use of the screw coupling of the invention for coupling rotating elements, for instance the output or driven shaft of a motor and a rotor driven thereby, it must be ensured that the axis of inertia coincides with the rotation axis.

Figure 11:
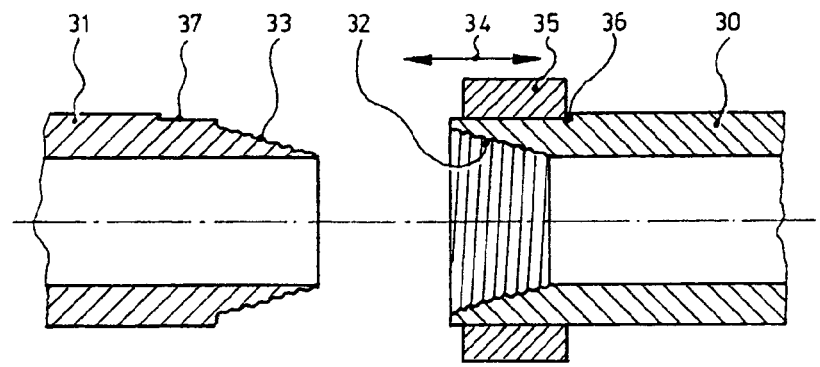
FIG. 11 shows a longitudinal section through a pipe coupling for two thick-walled pipes in uncoupled situation.

FIG. 11 shows a pipe coupling between two pipes 30 and 31. These latter are provided with respectively an internal conical screw thread 32 and an external conical screw thread 33 according to the invention. A rotation locking ring 35 axially slidable as according to an arrow 34 can provide for a rotation locking after the screw coupling between pipes 30, 31 has been realized.

Figure 12:
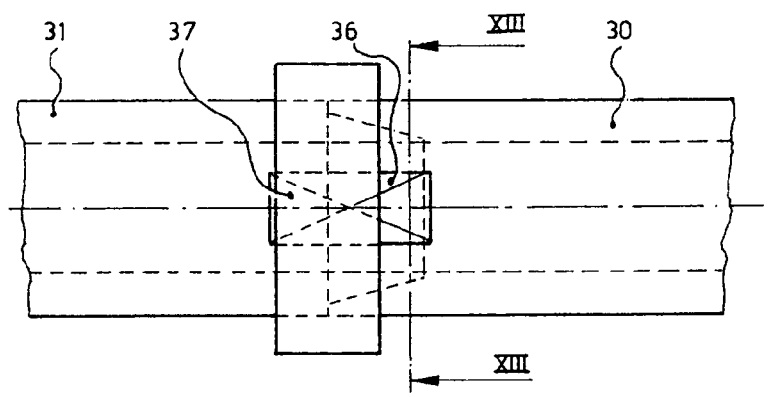
FIG. 12 is a top view of the pipe coupling according to FIG. 11 in coupled, active mode and after locking with a non-round locking ring.
Figure 13:
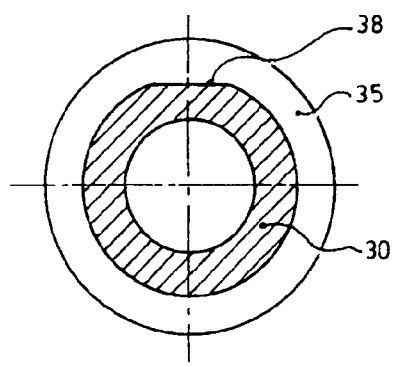
FIG. 13 shows the cross section III-III according to FIG. 12.

FIG. 12 shows an at least partly transparent top view of the locked situation. In the coupled position in FIG. 12 corresponding flat surfaces 36, 37 on pipe 30 and 31 respectively lie in a shared imaginary plane and the ring provided with a flat side 38 is in contact with both flat surfaces 36 and 37 and thus blocks the relative rotation of pipes 30 and 31.

Figure 14:
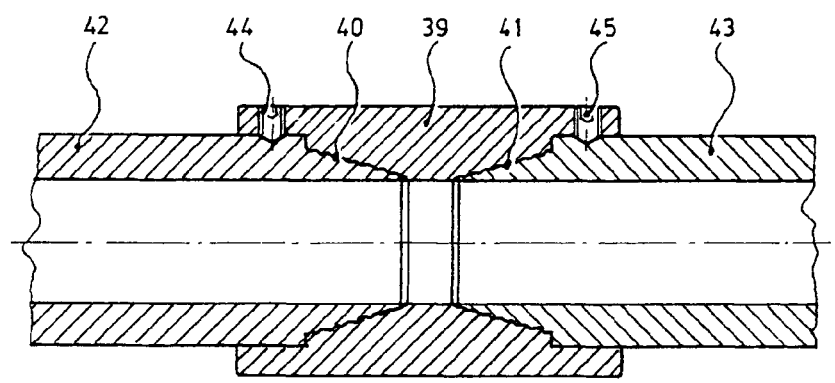
FIG. 14 shows a sleeve which, together with two pipes for coupling, forms two screw couplings according to the invention with rotation locking by means of socket screws.

FIG. 14 shows a coupling sleeve 39 which is coupled by means of two screw couplings 40, 41 according to the invention to respective pipes 42 and 43. Rotation locking is ensured by means of socket screws 44, 45, which engage with pressing force on the respective outer surfaces of pipes 42, 43.

Figure 15:
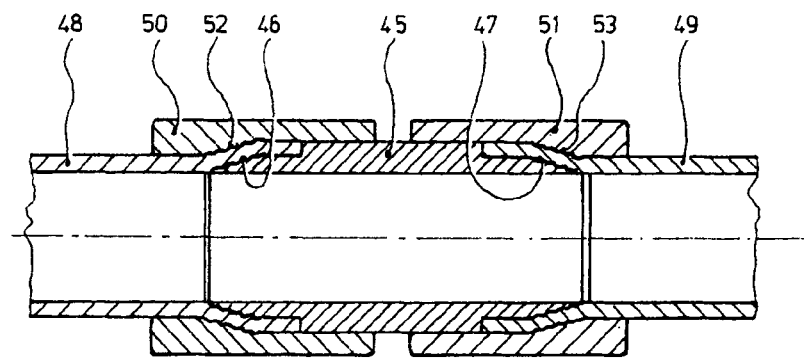
FIG. 15 shows a cross-section through a coupling sleeve according to the invention for coupling of two garden hoses.

FIG. 15 shows a coupling sleeve 45 with an external conical thread 46, 47 on either end. A respective hose 48, 49 is pushed thereover with some elastic deformation. A respective screw ring 50, 51 with internal thread 52, 53 respectively is arranged over this coupling zone by rotation in screwing and thus clamping manner. Applying the teaching according to the invention, a protruding sealing and pressure-resistant, i.e. tensively strong, coupling is in this way realized between hoses 48, 49 via the elastically and possibly also plastically deformed end zone of the relevant hose 48, 49.

Figure 16:
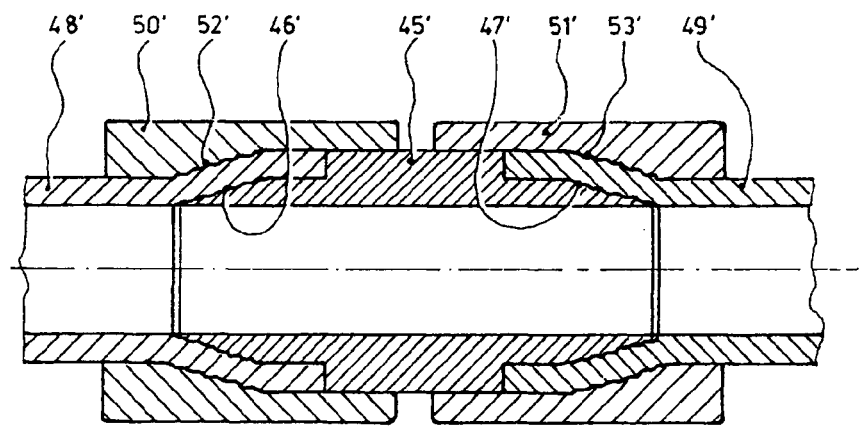
FIG. 16 shows a cross-section of similar type as drawn in FIG. 15, but now dimensioned for thick-walled rubber hoses.

FIG. 16 shows a technically corresponding structure, although for thick-walled rubber hoses. The various components corresponding to FIG. 5 are designated in FIG. 16 with the same reference numerals, here however with the addition of an accent.

Depending on the intended application, diverse materials can be considered for sleeve 45 and screw rings 50, 51. It is for instance possible to envisage a metal, although plastics with a sufficient mechanical strength, thermal resistance, chemical resistance and other desirable properties can also be applied. A plastic reinforced with fibres, such as glass fibres, is also suitable. Suitable plastics could be ABS and POM.

In the structures according to FIGS. 11, 12, 13, 14, 15 and 16 the mutually adjacent inner surfaces connect to each other without any substantial narrowing, obstruction or interruption. This greatly enhances the uninterrupted flow of through-flow medium.

Figure 17:
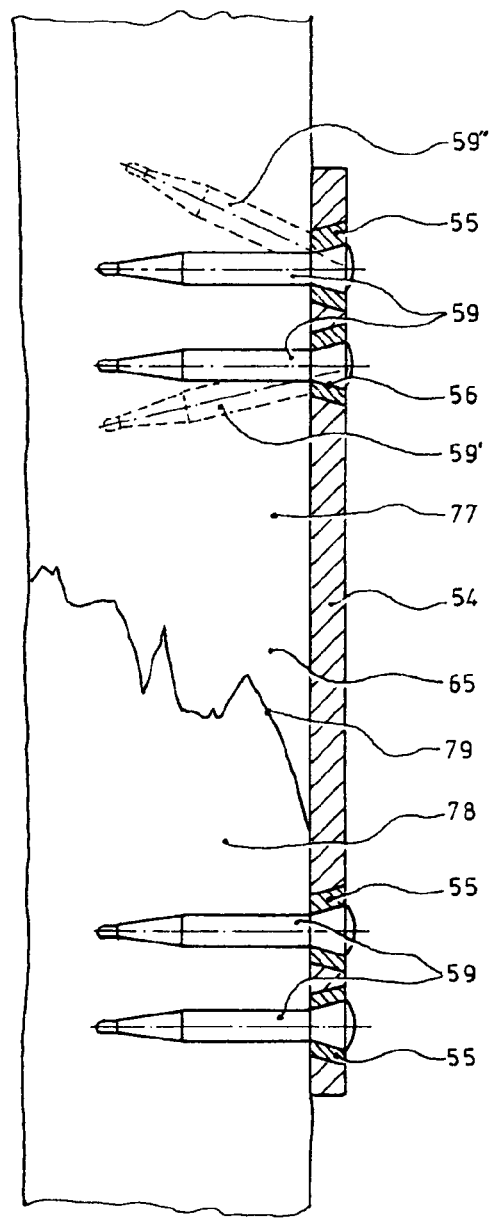
FIG. 17 shows a longitudinal section through a broken bone with a fixing plate with screws according to the invention for mutually fixing the adjacent parts of a broken bone.

FIG. 17 shows a coupling plate 54 for coupling adjacent parts 77, 78 of a bone 65. Coupling plate 54 has a number of inserts, all designated 55 and each provided with an internal conical thread 56. This thread 56 can co-act with the corresponding conical thread 57 of a screw head 58 such that threads 56 and 57 form a screw coupling according to the invention between insert 55 and a screw 59 of which head 58 forms part.

Coupling plate 54 extends over the bone break 79 and fixes bone parts 77, 78 relative to each other in the manner indicated in FIG. 17, such that these parts can grow against each other so that the bone will once again heal.

Figure 18:
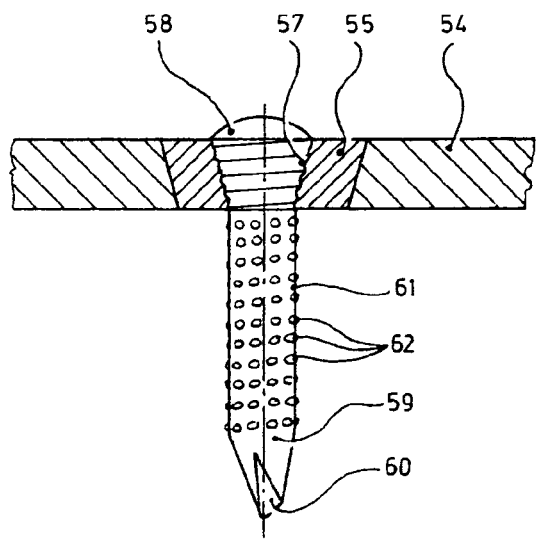
FIG. 18 shows a detail on larger scale of a self-drilling and self-tapping screw in an insert at 90'.

As FIG. 18 shows, screw 59 is provided with a self-drilling screw tip 60 and cylindrical shank 61 does not have a continuous screw thread as is usual for most screws, but a discrete screw thread which comprises a number of more or less sphere segment-shaped, at least rounded protrusions 62 disposed on a helical line around shank 61. Such a screw is highly suitable for bone surgery in particular.

Figure 19:
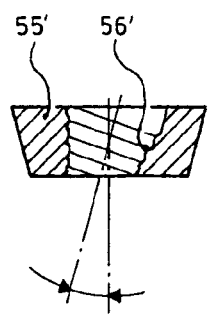
FIG. 19 shows an insert for drilling respectively screwing at an angle of about 90°−15°=75°.

FIG. 19 shows an insert piece 55', the conical screw thread 56' of which extends at an angle of about 15° relative to the normal. This angle corresponds to the position of screw 59' drawn in FIG. 17, which is drawn with broken lines, in addition to a screw 59 serving as reference and placed at normal position, which is drawn in full lines.

Figure 20:
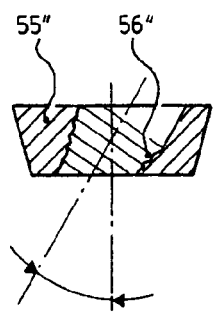
FIG. 20 shows a cross-section corresponding to FIG. 19 through a variant with an angle of about 90°−30°=60°.

FIG. 20 shows an insert piece 50" with an internal conical thread 56" extending at about 30° relative to the normal in accordance with screw 59" drawn with broken lines in FIG. 17.

Figures 21, 22:
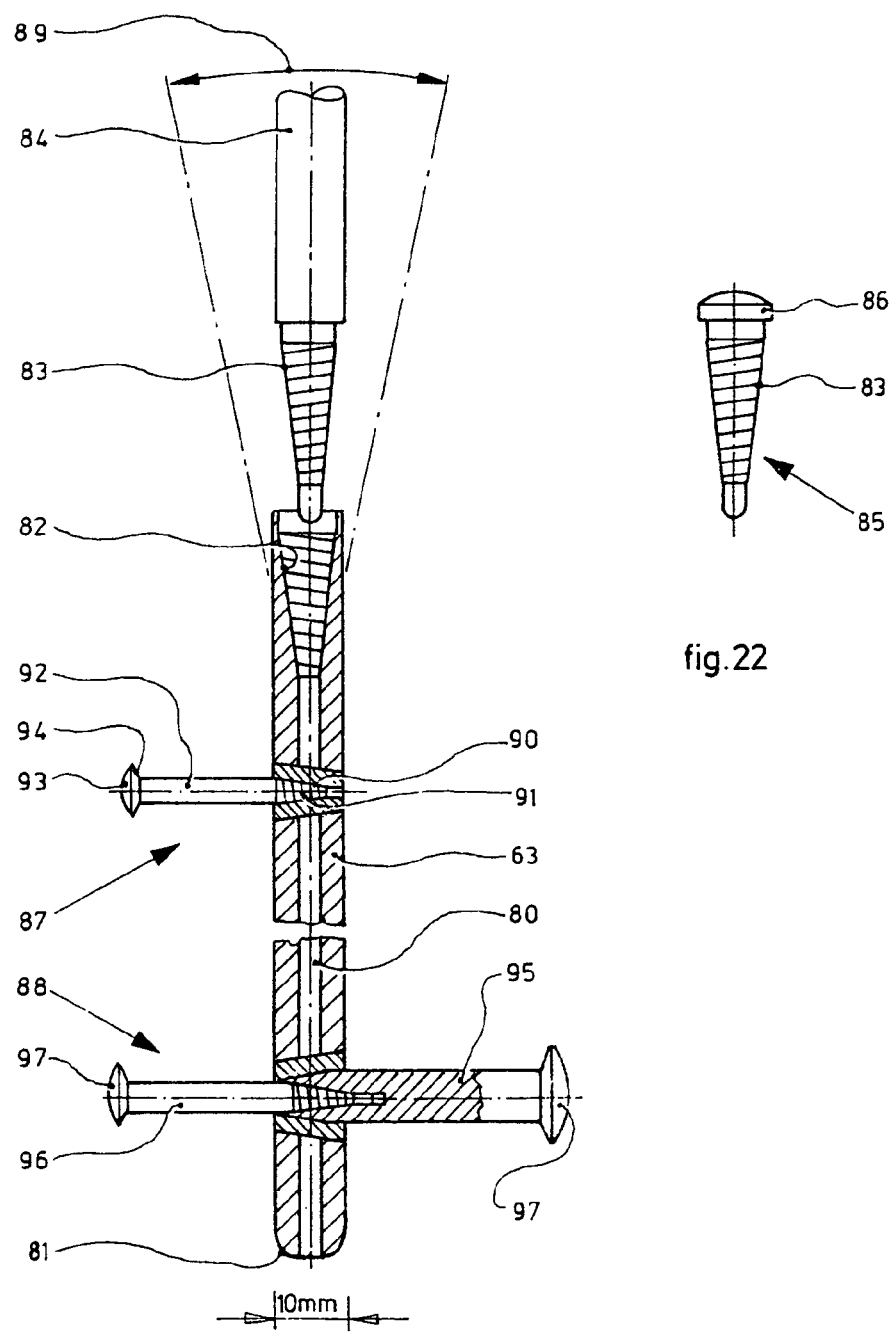
FIG. 21 shows a cross-section through a pin as used in a broken leg and a broken ankle, with various types of screw.
FIG. 22 shows a closing cap which covers the open top side of the pin after placing of the pin in the bone and after removal of the insertion aid.

Finally, FIG. 21 shows a pin 63 which is applied in surgery in the case of a broken leg or ankle, with a number of screw couplings according to the invention.

Pin 63 has a coaxial continuous hole 80. This is important because the pin, which must be arranged in a pre-drilled hole through the relevant bone, must be provided with a pressure equalization in respect of displacement of material, such as moisture, bone marrow, bore dust and the like present in the bone. Pin 63 has a rounded form on the underside. On its top side pin 63 has an internal screw thread 82 of the conical type according to the invention. This is intended for co-action with external screw thread 83 of a rod-like insertion aid 84 which is intended for pressing pin 63 with force into the hole drilled in the bone. Once this pin has been placed at its intended position, which the surgeon can determine on the basis of x-rays or other imaging techniques, aid 84 can be uncoupled from pin 63 by a simple return rotation, retracted and removed from the wound.

A closing cap 85 as according to FIG. 22 is then placed on pin 63. This closing cap is also provided with an external conical screw thread 83. The closing cap closes the end zone and hole 80 of pin 63 by means of an annular protruding head 86.

Analogously to the situation shown in FIG. 17, pin 63 has two coupling zones with screw connections according to the invention. These screw connections are designated 87 and 88.

Pin 63 has an internal screw thread 90 for co-action with the corresponding external thread 91 of a screw 92 with smooth shank and a head 93. Threads 90 and 91 form a screw connection according to the invention. The length of the smooth shank of screw 92 is preselected on the basis of the local geometry, such that annular outer surface 94 of head 93 can rest against the outer surface of the bone.

Screw connection 88 comprises a first screw 95 of a relatively large diameter, which co-acts with an internal conical screw thread of pin 63 by means of an external conical screw thread. Screw 95 itself likewise has on its free outer end an internal screw thread with which a second screw 96 can co-act. In this way a double screw connection according to the invention can be realized, wherein the smooth shanks of screws 95, 96 have the same central axes.

Head 86 of closing cap 85, head 93 of screw 92, head 97 of first screw 95 and head 98 of second screw 96 are all of the type which can be engaged by means of a suitable tool for the purpose of exerting a rotation force. Known engaging forms are suitable, such as a single elongate recess, a cross shape, a non-round recess or the like.

In FIG. 21 the angle 89 indicates highly schematically that the screw connection in question, just as all screw connections shown and described in this specification, is to a very great extent self-locating. This is a highly practical property in for instance the described application in the context of bone surgery. A surgeon can realize the screw coupling substantially "blindly". As soon as the tip of the external screw thread 83 comes into contact with the inner side of the part with internal screw thread 82, the locating function is in fact hereby completed, and the definitive screw coupling can be effected with some force by performing a continued axial displacement in combination with a rotation. This is a very important property of all screw couplings of the type according to the invention.

Drawn in FIG. 21 is an angle 89 which defines a general cone shape, the jacket surface of which roughly marks the limits over which the insertion aid can be inserted into internal screw thread 82. It will be apparent that in accordance with the teaching of the invention a very high degree of tolerance can be allowed in the necessary positioning accuracy. This makes relatively simple the preparatory work of the surgeon for removal of the pin after the relevant bone or joint has healed.

Figure 23:
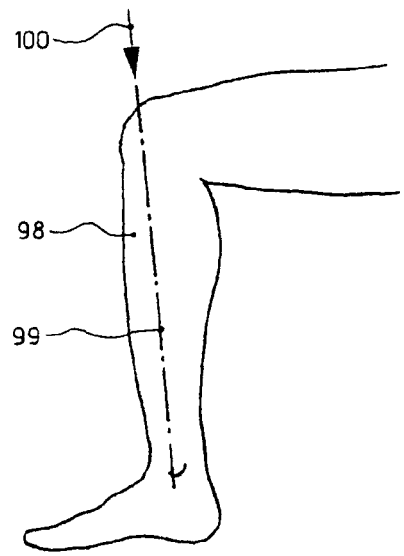
FIG. 23 shows a highly schematic transparent side view of the leg of a patient with a broken bone, wherein a dash-dot line indicates the position in which the pin is inserted in a pre-drilled hole in the bone by means of the insertion aid.

FIG. 23 shows a leg 98 of a patient. A dash-dot line 99 indicates that a hole is drilled in the bone as according to an arrow 100 for the purpose of inserting a pin 63.

Figure 24A:
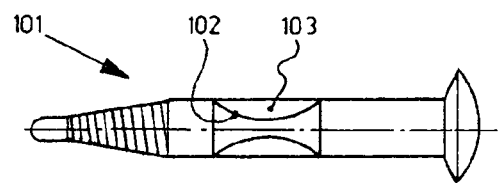
FIG. 24A shows a side view of a bolt with a reduced bending stiffness.

FIG. 24A shows an alternative screw 101 which differs from screw 74 to the extent that its smooth shank has an annular recess 102, whereby the screw possesses a certain measure of flexibility. This is an important option for the intended application in the fixing of bone parts. In order to nevertheless ensure a smooth shank and to ensure that bone does not begin to grow into annular recess 102, whereby it would be difficult or impossible to remove the screw, annular recess 102 is filled with a suitable polymer material 103, such as polytetrafluoroethylene (PTFE).

Figure 24B:
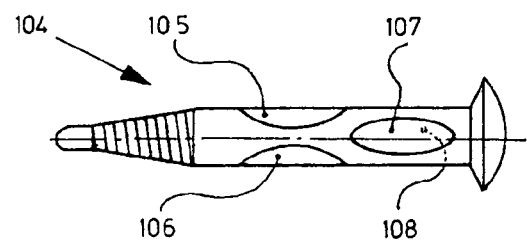
FIG. 24B shows a side view of a bolt with reduced bending stiffness in another embodiment.

FIG. 24B shows a variant. A screw 104 according to FIG. 24B does not comprise a peripheral recess 102 but two pairs of recesses 105, 106 and 107, 108 respectively mutually offset through 90°.

Both screw 101 and screw 104 thus have a substantially isotropic additional flexibility.

Figure 25:
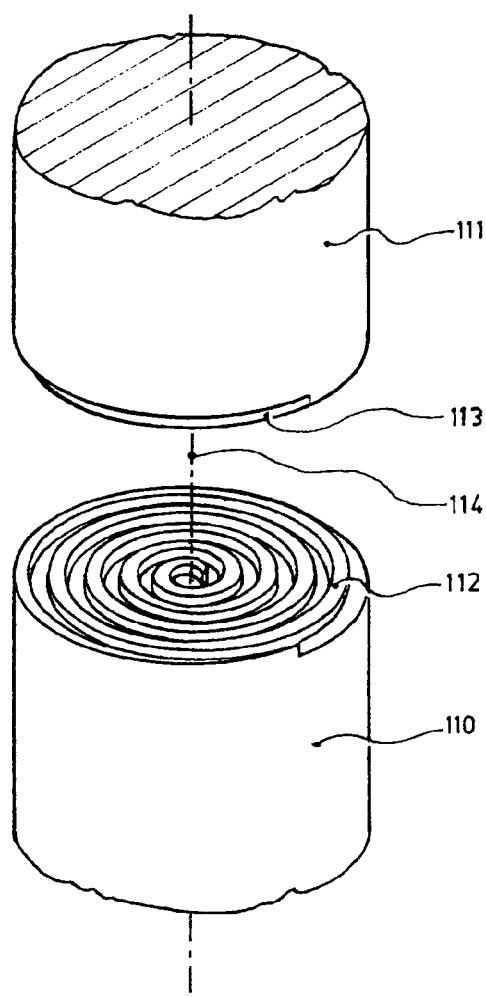
FIG. 25 shows a perspective exploded view of a screw coupling between two bodies with screw threads, the base surfaces of which are flat, i.e. have the shape of truncated cones with apex angles of 2×90°.

FIG. 25 shows two bodies 110, 111 placed at a mutual distance and provided with schematically represented screw threads 112, 113 respectively of the type according to the invention. In this embodiment the base surfaces are flat or, in other words, the base surfaces take the form of truncated cones with apex angles of 2×90°. The shared rotation axis of the screw coupling is designated with reference numeral 114.

Figure 26:
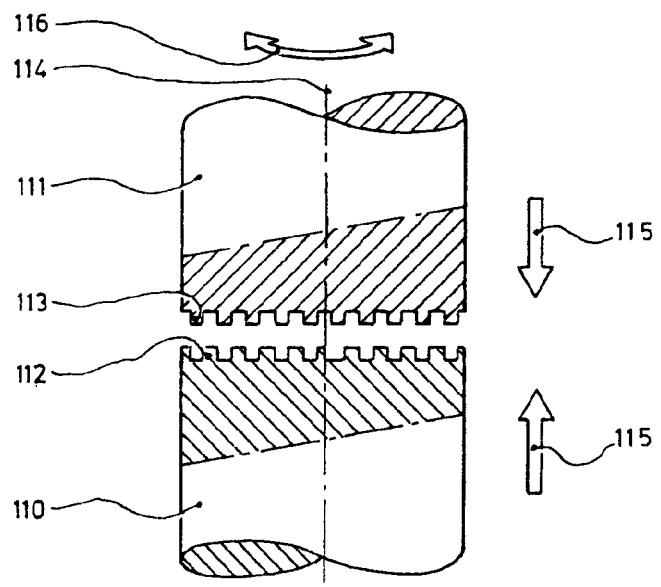
FIG. 26 shows a longitudinal section through the two bodies according to FIG. 25 in a situation in which the bodies are moved toward each other such that the one screw thread is introduced into the other screw thread.
Figure 27:
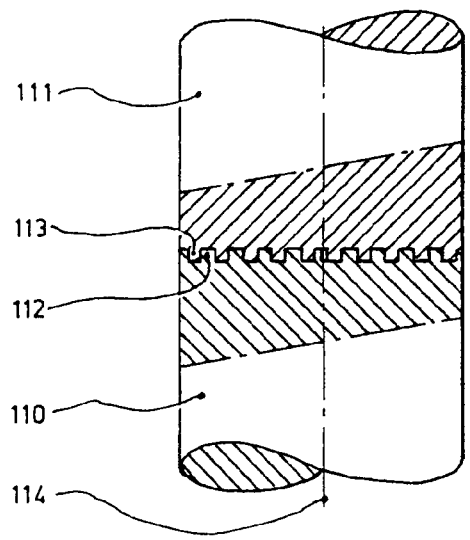
FIG. 27 shows a longitudinal section corresponding to FIG. 26 of the situation in which the bodies have been moved against each other, the screw threads have been introduced into each other and a rotation has taken place, whereby the bodies are coupled to each other.

FIG. 26 shows with arrows 115 that bodies 110, 111 are first moved toward each other such that they mutually engage and the one screw thread is introduced into the other. Once this situation has been reached, the two bodies 110, 111 placed against each other are rotated relatively as according to an arrow 116, either in the one direction or in the other, depending on the forms of the screw threads. Particularly in the case of at least more or less symmetrical screw threads the rotation direction is immaterial. The coupling is brought about by the rotation. The coupled situation in question is shown in FIG. 27. Only by performing a subsequent rotation counter to the direction of the performed rotation can the coupling between the two bodies be undone. The coupling is often so strong that an impulsive force, for instance a tap, a blow or an impact, must be applied to be able to cause the bodies to perform the desired relative displacement.

The profile depth of the screw threads need often only be small, for instance several tenths of a millimeter. Other than suggested in the schematic FIGS. 25, 26 and 27, such screw threads are often barely visible to the naked eye.

Finally, it is noted generally that the materials applied for surgical purposes are of a biocompatible type, for instance surgical steel, vitallium or the like.

The invention claimed is:

1. A screw coupling comprising two bodies, one of which has an external screw thread and another has an internal screw thread complementary thereto, wherein the screw threads are superimposed onto two base surfaces monotonously narrowing and widening respectively in the direction of a central axis, the longitudinal section of each of these screw threads relative to the central axis being a periodic univalent function which is continuous at least at the inflection points, and
wherein
the first derivative of the longitudinal section of each screw thread along the base surface is a continuous function;
the second derivative of the longitudinal section of each screw thread along the base surface is a continuous function;
the second derivative of the longitudinal section of each screw thread relative to the central axis is a continuous function at least in the region of the inflection points;
the screw threads are in mutual contact over a substantial surface area differing from line contact; and
a central locating pin is added to the external screw thread and a central cavity is added to the internal screw thread, into which the locating pin fits and into which the locating pin can already be inserted before the screw threads come into mutual contact.

2. The screw coupling as claimed in claim 1, wherein both screw threads are substantially identical.

3. The screw coupling as claimed in claim 1, wherein the function is symmetrical along the base surface.

4. The screw coupling as claim in claim 3, wherein the function is a sine function.

5. The screw coupling as claimed in claim 1, wherein the function is calculated on the basis of a Fourier series.

6. The screw coupling as claimed in claim 5, wherein the harmonies above a ranking number of 5 are ignored.

7. The screw coupling as claimed in claim 1, wherein the screw coupling is dimensioned such that, after insertion of the external screw thread into the internal screw thread, the bodies must be rotated through an angle of rotation of less than 360° relative to each other in order to block further rotation.

8. The screw coupling as claimed in claim 7, wherein the angle of rotation lies in the range of about 70°-240°.

9. The screw coupling as claimed in claim 8, wherein the angle of rotation lies in the range of about 120°-180°.

10. The screw coupling as claimed in claim 1, wherein a half-apex angle of a cone tangent of the base surfaces is considerably smaller at each axial position than the natural shear angle of the applied materials under torsional stress.

11. The screw coupling as claimed in claim 10, wherein said shear angle amounts to 45° and the half-apex angle has a value of a maximum of about 30°.

12. The screw coupling as claimed in claim 10, wherein the value of the half-apex angle amounts to about 15°±50%.

13. The screw coupling as claimed in claim 1, wherein sealing means are added to the screw coupling.

14. The screw coupling as claimed in claim 1, wherein each of the two bodies has a contact surface, wherein the two contact surfaces press against each other in the active mode of the screw coupling and thus increase the bending stiffness of the screw coupling.

15. The screw coupling as claimed in claim 1, further comprising locking means for locking the screw coupling against undesired relative return rotation of the bodies.

16. The screw coupling as claimed in claim 15, wherein the locking means comprise a ring with a non-round inner surface which is slidable and securable over the screw coupling, wherein the inner surface co-acts with corresponding, complementarily formed outer surfaces around the respective screw threads, and the outer surfaces lie at least substantially in one imaginary plane in the active mode of the screw coupling.

17. The screw coupling as claimed in claim 16, wherein said inner surface and said outer surfaces are flat.

18. The screw coupling as claimed in claim 15, wherein the locking means comprise friction means.

19. The screw coupling as claimed in claim 18, wherein the friction means comprise a friction element present on the one body, wherein the friction element is added to one of the two bodies, and the friction element exerts some pressure on an opposite contact surface of the other body in the active mode of the screw coupling.

20. The screw coupling as claimed in claim 1, wherein the one body is a screw comprising a counter-sinkable head of an at least more or less truncated conical main shape which corresponds to the base surface, and a threaded end with a screw thread which is superimposed onto a cylindrical base surface, wherein said main shape has the same central axis as said base surface and the pitch of the one screw thread is the same as that of the other screw thread.

21. The screw coupling as claimed in claim 20, wherein the screw thread superimposed onto the cylindrical base surface is of a discrete type.

22. The screw coupling as claimed in claim 1, wherein at least one of the screw threads has at least one zone extending along the base surface which is free of at least the most protruding part of the screw thread and thus forms a passage for a medium.

23. The screw coupling as claimed in claim 1, wherein the screw thread is formed by making use of a rotatingly driven bit, a spherical milling head, or a spark machining tool modeled in accordance with the desired shape of the screw thread, which is driven in both an axial direction and a radial direction and runs successively through a rotating path relative to the relevant body.

24. The screw coupling as claimed in claim 1, wherein the screw coupling is a coupling between two pipes through which medium can flow, the mutually connecting inner surfaces of which pipes connect to each other without any appreciable narrowing, obstruction or interruption, such that medium flowing through the pipes can pass over the screw coupling with negligible disruption.

25. The screw coupling as claimed in claim 1, wherein the base surfaces are flat and take the form of truncated cones with apex angles of 2×90°.

26. The screw coupling as claimed in claim 25, wherein the screw coupling is dimensioned such that, after insertion of one screw thread into the other screw thread, the bodies must be rotated relative to each other through an angle of rotation of less than 90° in order to block a further rotation.

\* \* \* \* \*

UNITED STATES PATENT AND TRADEMARK OFFICE
CERTIFICATE OF CORRECTION

PATENT NO. : 8,696,285 B2　　　　　　　　　　　　　　　　　　　　Page 1 of 1
APPLICATION NO. : 12/935988
DATED : April 15, 2014
INVENTOR(S) : Augustinus Wilhelmus Maria Bertels It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 586 days.

Signed and Sealed this

Twenty-ninth Day of September, 2015

Michelle K. Lee
*Director of the United States Patent and Trademark Office*